(12) United States Patent
Sapire

(10) Patent No.: US 10,111,557 B2
(45) Date of Patent: Oct. 30, 2018

(54) FOOD PROCESSOR DAMPEN SYSTEM

(71) Applicant: CAPBRAN HOLDINGS, LLC, Los Angeles, CA (US)

(72) Inventor: Colin Sapire, Los Angeles, CA (US)

(73) Assignee: Capbran Holdings, LLC, Los Angeles, CA (US)

( * ) Notice: Subject to any disclaimer, the term of this patent is extended or adjusted under 35 U.S.C. 154(b) by 198 days.

(21) Appl. No.: 15/221,404

(22) Filed: Jul. 27, 2016

(65) Prior Publication Data

US 2018/0028020 A1   Feb. 1, 2018

(51) Int. Cl.
| F16F 1/373 | (2006.01) |
| A47J 43/07 | (2006.01) |
| A47J 43/044 | (2006.01) |
| F16F 1/36 | (2006.01) |
| F16F 15/08 | (2006.01) |

(52) U.S. Cl.
CPC ......... *A47J 43/0705* (2013.01); *A47J 43/044* (2013.01); *A47J 43/0716* (2013.01); *A47J 43/0755* (2013.01); *A47J 43/0772* (2013.01); *F16F 1/36* (2013.01); *F16F 15/08* (2013.01); *A47J 2043/04463* (2013.01); *F16F 2224/025* (2013.01); *F16F 2234/02* (2013.01)

(58) Field of Classification Search
USPC ....... 248/563, 565, 568, 580, 581, 603, 605, 248/606, 613, 615, 632, 634, 635, 638; 267/139, 140, 152, 153
See application file for complete search history.

(56) References Cited

U.S. PATENT DOCUMENTS

| 1,697,814 | A | | 1/1929 | Forbes |
| 1,951,013 | A | | 3/1934 | Flintermann |
| 2,456,087 | A | | 12/1948 | Schneider |
| 3,175,833 | A | | 3/1965 | Morse |
| 4,295,691 | A | | 10/1981 | Rubenthaler |
| 4,306,708 | A | * | 12/1981 | Gassaway ................ F16M 7/00 248/544 |
| 4,522,378 | A | | 6/1985 | Nelson |
| 4,606,238 | A | | 8/1986 | Ikemoto et al. |
| 4,640,479 | A | * | 2/1987 | Shely .................. H02G 3/0641 16/2.2 |
| 4,805,868 | A | * | 2/1989 | Claude ...................... F01P 5/04 165/122 |

(Continued)

*Primary Examiner* — Terrell L McKinnon
*Assistant Examiner* — Michael McDuffie
(74) *Attorney, Agent, or Firm* — Trojan Law Offices

(57) ABSTRACT

A vibration damper system used in a food processor to reduce the vibration of a high power motor that has varying speed cycles is disclosed. The motor is suspended from a ceiling that is mounted to the motor base through a plurality of bolted joints. The bolted joints are surrounded by a grommet that has a unique shape. The grommet comprises generally three parts, which are an upper portion, a middle portion, and a lower portion. The middle portion is smaller than other portion so that it creates a recess for the ceiling to be sandwiched between the grommet. In a preferred embodiment, the lower portion of the grommet further comprises a plurality of petal members that provide a non-uniform spring rate to the grommet so that the grommet is adapted best to reduce the upward impulse of the motor. The food processor also contains a novel air ventilation system.

8 Claims, 9 Drawing Sheets

(56) References Cited

U.S. PATENT DOCUMENTS

| | | | |
|---|---|---|---|
| 4,869,454 A | 9/1989 | Byrne et al. | |
| 4,884,656 A * | 12/1989 | Baheti | B41J 29/04 |
| | | | 181/207 |
| 5,335,893 A * | 8/1994 | Opp | B64C 1/066 |
| | | | 248/632 |
| 5,746,411 A * | 5/1998 | Bruas | F16F 1/3713 |
| | | | 248/632 |
| 5,761,031 A * | 6/1998 | Ajmani | G11B 33/08 |
| | | | 361/679.34 |
| 5,765,819 A | 6/1998 | Hummel | |
| 5,871,199 A * | 2/1999 | Koike | F16F 1/3732 |
| | | | 248/615 |
| 6,196,516 B1 * | 3/2001 | Lan | G06F 1/184 |
| | | | 248/615 |
| 6,220,585 B1 * | 4/2001 | Heron | F16F 1/3732 |
| | | | 267/152 |
| 6,247,686 B1 | 6/2001 | Gabbin | |
| 6,499,714 B1 * | 12/2002 | Wike | F16B 5/0258 |
| | | | 248/632 |
| 7,510,163 B2 * | 3/2009 | Schlitzkus | B60T 8/3685 |
| | | | 248/548 |
| 7,926,780 B2 * | 4/2011 | Yeh | F16F 15/08 |
| | | | 248/632 |
| 8,056,880 B2 * | 11/2011 | Tsuchida | G11B 33/124 |
| | | | 248/580 |
| 8,235,350 B2 * | 8/2012 | Tetsuda | F16F 1/3732 |
| | | | 248/560 |
| 8,794,584 B2 * | 8/2014 | Shimada | F16M 13/02 |
| | | | 248/615 |
| 9,958,025 B2 * | 5/2018 | Kuraishi | H02K 9/04 |
| 2004/0130086 A1 | 7/2004 | Tsai et al. | |
| 2005/0067548 A1 * | 3/2005 | Inoue | F16L 3/237 |
| | | | 248/635 |
| 2010/0027231 A1 * | 2/2010 | Chang | F16F 1/3732 |
| | | | 361/807 |
| 2013/0056613 A1 | 3/2013 | Thomas | |
| 2015/0267861 A1 * | 9/2015 | Azof | B65G 69/001 |
| | | | 267/139 |

* cited by examiner

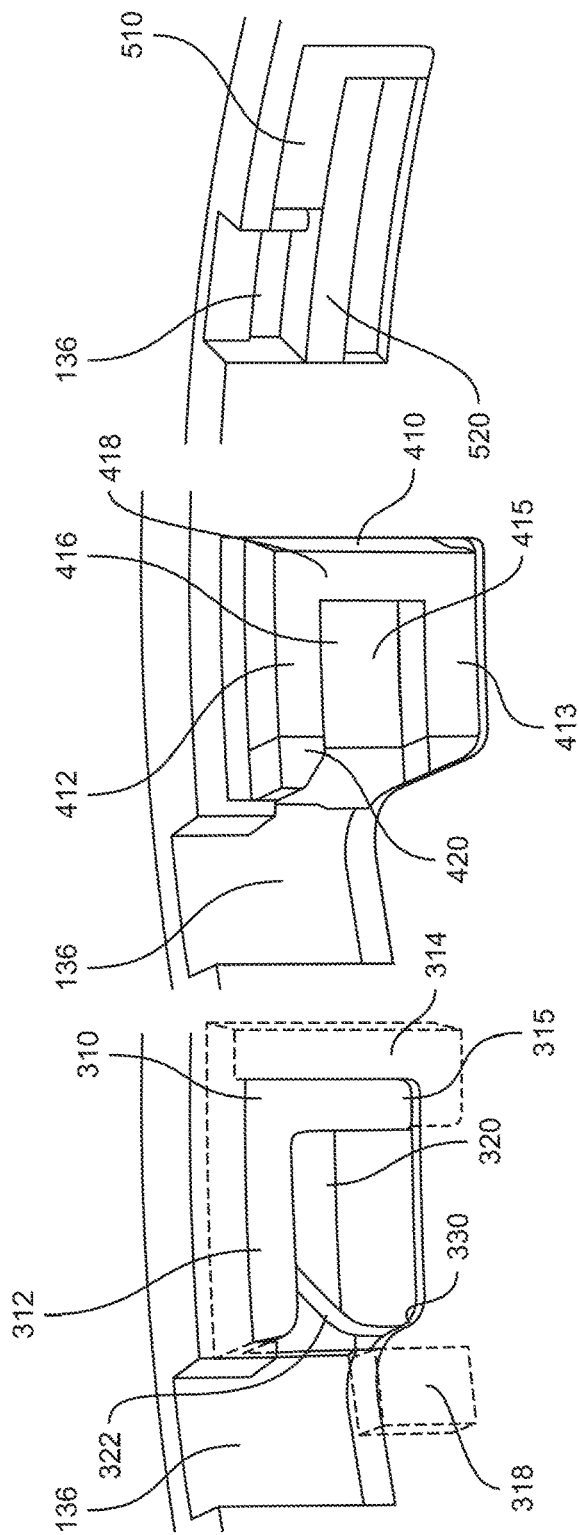

FOOD PROCESSOR DAMPEN SYSTEM

TECHNICAL FIELD OF THE DISCLOSURE

The present invention relates to household and kitchen appliances. More particularly, the present invention relates to food processors with high-speed motors. Even more particularly, the present invention relates to the vibration dampening system and air ventilation system for food processors with high-speed motors.

BACKGROUND

Electrical household food processors, including blenders, mixers, and slicers, are common. There is increasing demand for high performance food processors that can process different kinds of foods and materials. High powered motors that operate at over 700 Watts are used in premium food processors. Such food processors are often equipped with different speed cycles to meet the various preferences of users.

One major drawback of high powered motors is the vibration and noise that they generate. Existing high performance food processors sometimes vibrate at undesirable levels and generate a significant level of noise when the motors are operating at high speeds. This problem is amplified when a motor undergoes a change in the speed cycle. Due to the change in magnetic field, the acceleration or deceleration of a motor at high speeds will create significant upward or downward impulses that will cause a further increase in the vibration of the motor.

Another challenge for high performance food processors is that high speed motors often generate significant amounts of heat. Hence, existing high performance food processors are often equipped with powerful fans to dissipate the heat. Yet, such fans are usually noisy and existing air ventilation designs are not satisfactory, allowing dust to easily accumulate within the housing of the motor so that the efficiency of heat dissipation deteriorates over time.

SUMMARY

It is an objection of the present invention to provide a high performance food processor that has a low level of vibration. It is also an objective of the present invention to address particular vibrations caused by high speed operating cycles. It is a further objective of the present invention to provide a novel air ventilation system that reduces the noise produced in a food processor and provides efficient heat dissipation.

In one aspect of some embodiments of the present invention, a blender comprises a motor base and a food-processing unit removably mounted on the motor base. The motor base has a well to receive the food-processing unit. On the wall of the well, there are several recesses and each recess contains a safety switch that activates the motor when pressed. Rubber cushions are located inside the recesses to reduce the vibration of the blender. Several protruding members are present on the food-processing unit so that the food-processing unit can activate the blender when inserted into the motor base.

In one particular embodiment, the rubber cushion is in a reversed C shape and is permanently mounted on the upper part of the safety switch as part of the safety switch. Coupled with the safety switch, the rubber cushion presents a channel for a protruding member of the vessel to slide within. The back of the channel is a rubber wall. When inserted, the rubber cushion surrounds the protruding member. The rubber cushion then provides dampening of the vessel in the vertical, circumferential and radial directions.

In another aspect of some embodiments of the present invention, a motor is mounted and suspended from a motor mounting ceiling. The ceiling is mounted to the housing of the motor base through several bolted joints. Each bolted joint is surrounded by a rubber grommet, which is a vibration damper. The ceiling is placed at a level that is sandwiched between the upper portion and lower portion of the grommets so that the grommets efficiently reduce vibration of the ceiling that is caused by the motor hung from the ceiling.

The grommet is formed of an elastomer. It comprises an upper portion which is a first ring shaped cylinder having an upper outer circumference; a middle portion which is a second ring shaped cylinder having a middle outer circumference that is smaller than the upper outer circumference; a lower portion, which further comprises a third ring shaped cylinder and a plurality of petal members attached on a bottom surface of the third ring shaped cylinder; the third ring shaped cylinder having a lower outer circumference that is larger than the middle outer circumference. The grommet also has a bore that runs through it. The plurality of petal members surround the bore.

In a preferred embodiment, the petal members are in the shape of a quarter torus. The quarter torus shaped petal members are defined by a substantially flat vertical surface, a substantially flat horizontal surface, and a curved quarter surface of the torus. The substantially flat vertical surface surrounds the bore so that the petal members extend the height of the bore. The curved outer surface of the quarter torus is oriented to face outward and downward such that the lower part of the grommet resembles an inversed dome shape. The shape of the petal members of the grommets are specially designed to dampen the upward impulses. Each petal member has an increasing horizontal cross-sectional area in the upward direction. Hence, the spring rate of the lower part of the grommet is not uniform. The grommet becomes increasingly stiffer upward. For any upward impulse, the stiffness of the grommet is more resilient at the beginning of the upward motion. Then, when a vibration continues to move upward, the horizontal cross-sectional area of the petal members increases such that the grommet becomes more inelastic. The change in stiffness of the grommet from resilient to inelastic is an effective way to dampen the upward forces caused by vibration of the motor.

In yet another aspect of some embodiments of the present invention, a blender also includes a novel air ventilation system. The system has a plurality of air inlets located on the bottom of the motor base, a plurality of air outlets located at the side of the motor base, and a centrifugal fan that is driven by the motor. The centrifugal fan comprises a shaft that is connected to the motor to drive the fan, a hub made from the circular plate of the fan, and a series of forward curved blades mounted on the hub. The motor base provides passages to direct air from inlets to enter the fan chamber. The air passes down vertically to the blades of the centrifugal fan, makes a turn, and exits horizontally through the outlets. The inlets are located at left and right sides of the bottom of the motor base while the outlets are located at the back side of the motor base. The separation of the inlets and the outlets allows the air to flow in a single direction, avoiding conflicting airflows, improves the ventilation of the system, and reduces the accumulation of dust near and around the fan.

BRIEF DESCRIPTION OF THE DRAWINGS

The present teachings may be better understood by reference to the following detailed description taken in connection with the following illustration, wherein:

FIG. 3 illustrates a rubber cushion mechanism to reduce vibration of a food processor in accordance with an embodiment of the present invention.

FIG. 4 illustrates another rubber cushion mechanism to reduce vibration of a food processor in accordance with another embodiment of the present invention.

FIG. 5 illustrates yet another rubber cushion mechanism to reduce vibration of a food processor in accordance with yet another embodiment of the present invention.

DETAILED DESCRIPTION OF EMBODIMENTS

The following description is made for the purpose of illustrating the general principles of the invention and should not be taken in a limiting sense. The scope of the invention is best determined by reference to the appended claims.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing.

Figure 1:
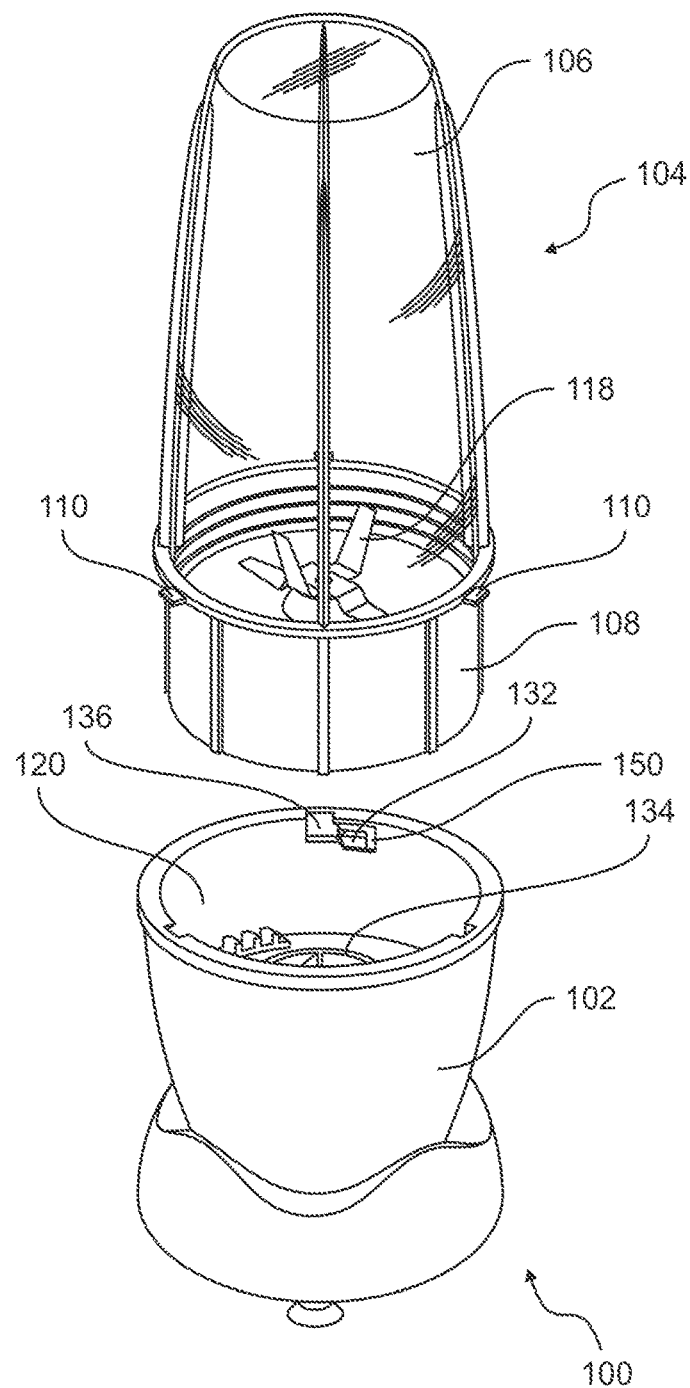
FIG. 1 illustrates a perspective view of a food processor in accordance with an embodiment of the present invention.

Turning to the drawings, FIG. 1 is directed to a perspective view of an exemplary blender 100 in accordance with an embodiment of the present invention. The blender 100 comprises a motor base 102 and a top mounted food-processing unit 104 removably mounted on the motor base 102. The motor base 102 has a well 120 to receive the food-processing unit 104. A motor coupling 134 is located at the center of the well 120 to drive the blade 118 of the food-processing unit 104. On the wall of the well 120, there are several recesses 136 and each recess 136 contains a safety switch 132 that activates the motor when pressed. Rubber cushions 150 are also located inside the recesses 136 to reduce the vibration of the blender 100 in a manner described in further detail below.

The food-processing unit 104 comprises an elongated vessel 106 that is removably engaged with a blade base 108 through a pair of screw threads. As those skilled in the art will appreciate, the food-processing unit 104 can be of different types and sizes and each blender unit can be sold with several food-processing units 104. On the circumference of the vessel 106, there are several protruding members 110 that act as safety actuators to activate the safety switches 132 located at the motor base 102. Since the protruding members 110 are located on the vessel 106, the safety switches 132 will not be pressed to turn on the power of the blender 100 when a naked blade base 108 (without the cover of the vessel 106) is inserted into the well 120 of the motor base 102.

Figure 2:
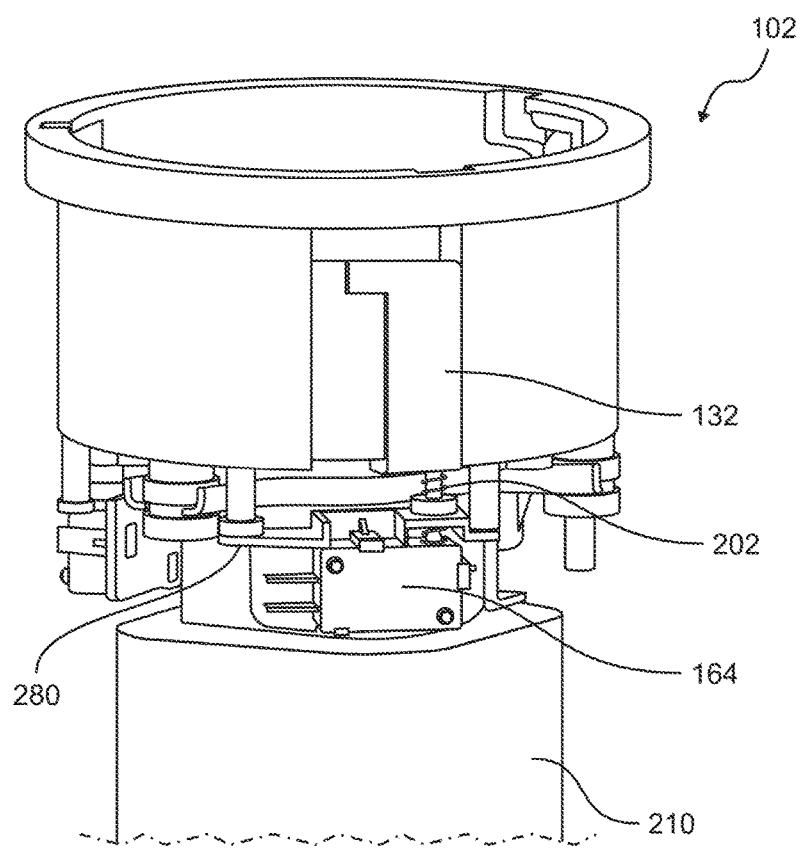
FIG. 2 illustrates an internal view of a food processor showing a safety mechanism in accordance with an embodiment of the present invention.

FIG. 2 shows an internal view of a motor base 102 with the emphasis on the structure of a safety switch 132 in accordance with an embodiment of the present invention. The safety switch 132 is a vertical-rod shaped structure that is mounted near the motor mount ceiling 280 and is capable of moving from a higher position to a lower position. Unless it is pressed by an external force to its lower position, it naturally resides at its upper position because it is biased by a spring 202. A micro switch 164 is located at the bottom of the safety switch 132. The pressing of the safety switch 132 activates the micro switch 164, in turn closing the circuit of the motor 210 in the motor base 102. Hence, the circuit of the motor 210 is open when the safety switch 132 is not pressed and closed when the safety switch 132 is pressed. The motor base 102 can have more than one safety switch 132 such that the circuit of the motor 210 is only closed when all of the safety switches 132 are pressed.

Since the safety switches 132 are pressed by the protruding members 110 of the vessel 106 during the motor's operation and are mounted near the motor mount ceiling 280, they are sensitive to the vibration of the motor. The vibration is particularly strong when the motor 210 is a high-power motor because of the vibration caused by the motor itself and vibration caused by the centrifugal force caused by the high rotating speed of the blade 118. Damage to the protruding members 110 and safety switches 132 caused by excessive vibration can result over prolonged use. Hence, the dampening of the vibration in these areas is important to the overall effectiveness of the food processing unit. In some preferred embodiments, a rubber cushion 220 is located around the top of safety switch 132 to reduce the vibration of the entire system.

FIGS. 3-5 illustrate different types of rubber cushions that are used in different embodiments of the present invention. In some embodiments, the rubber cushions are separate units that reside in the recesses 136. In other embodiments, the rubber cushions are part of the safety switch so that they provide direct dampening of the system.

Figure 7:
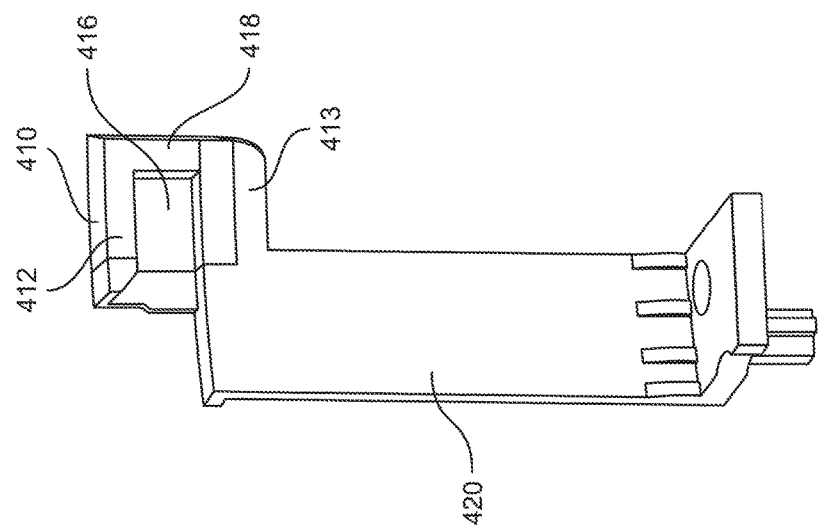
FIG. 7 is an isolated view of a safety switch and a rubber cushion mechanism shown in FIG. 4.
Figure 6:
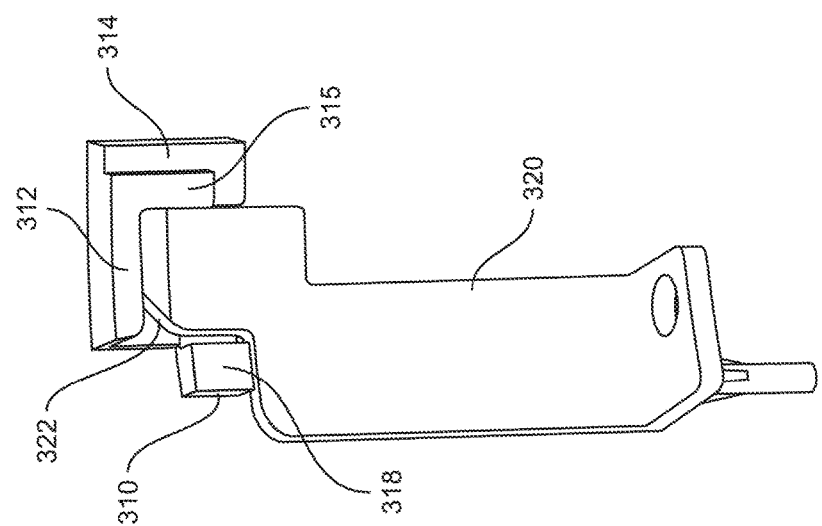
FIG. 6 is an isolated view of a safety switch and a rubber cushion mechanism shown in FIG. 3.

For example, in FIG. 4, the rubber cushion 410 is in a reverse C shape and is permanently mounted on the upper part of the safety switch 420 as part of the safety switch 420. Coupled with the safety switch 420, the rubber cushion 410 presents a channel 415 for a protruding member 110 of the vessel 106 to slide within. The back of the channel 415 includes a rubber wall 416. When inserted, the rubber cushion 410 surrounds the protruding member 110 of the vessel 106. The rubber cushion 410 provides dampening of the vessel 106 in the vertical direction through the rubber walls 412 and 413, in the circumferential direction through the rubber wall 418, and in the radial direction through the rubber wall 416. Since the rubber cushion 410 itself is a part of the safety switch 132, it also provides dampening of the safety switch 132 in vertical, radial and circumferential directions through the walls 412, 413, 416, and 418. FIG. 7 shows an isolated view of the safety switch 132 using the design of the rubber cushion 410 in accordance with an embodiment of the present invention.

FIG. 3 provides an example of rubber cushion 310 that resides in the recess 136 but is not permanently attached to either the motor base 102 or the safety switch 320. FIG. 7 shows an isolated view of the rubber cushion 310 and the safety switch 320. The safety switch 320 can move relative to the rubber cushion 310. When the protruding member 110 of the vessel 106 starts to slide into the socket of the recess 136, it pushes the safety switch 320 downward via the tapered edge 322 while the rubber cushion 310 remains relatively stationary. Hence, the protruding member 110 will be inserted in between the wall 312 of the rubber cushion 310 and the top edge of the safety switch 320. The surrounding rubber cushion 310 provides dampening of the safety switch and of the vessel 106. The exposed part 315 and the left bottom member 318 of the rubber cushion 310 prevents the rubber cushion 310 from being removed from the recess 136 as the exposed part 315 resides outside the interior of the motor base 102 while the left bottom member 318 is located right underneath the floor 330 (see FIG. 3). These two parts alleviate the vibration both in the vertical and in the circumferential direction. Although the rubber cushion 310 resides in the recess 136, it is not permanently affixed to the motor base 102. The flexibility of the positioning of rubber cushion 310 enhances the dampening of the vibration.

Figure 8:
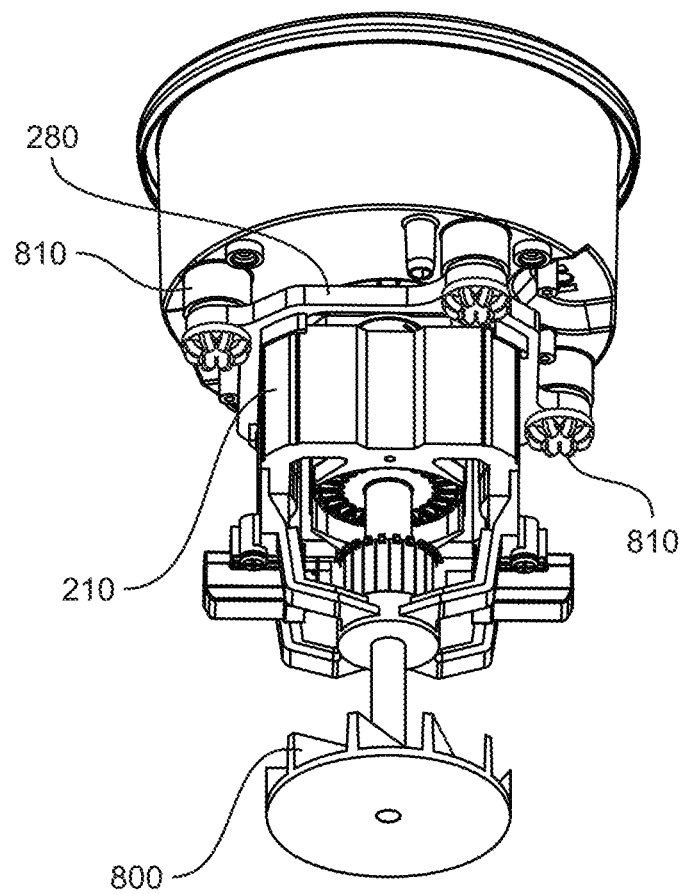
FIG. 8 is an internal view of a food processor showing how a motor is mounted in accordance with an embodiment of the present invention.

Now referring to FIG. 8, it is an internal view of the motor base 102 that shows the mounting of a high-power motor 210 in accordance with some embodiments. The high power motor 210 operates at 1200 Watts. But in preferred embodiments, the high-power motor 210 can operate at 1700 Watts or above. The high-power motor 210 rotates at such a high speed that it creates a significant level of noise and vibration without proper dampening. The motor 210 is mounted and suspended from the ceiling 280. The ceiling 280 is mounted to the housing of the motor base 102 through several bolted joints 820. Each bolted joint 820 is surrounded by a rubber grommet 810, which is a vibration dampening block. The ceiling 280 is placed at a level that is sandwiched between the upper portion and lower portion of the grommets 810 so that the grommets 810 efficiently reduce vibration of the ceiling 280 that is caused by the motor 210 hung from the ceiling 280 in a manner to be discussed in further detail below.

Figure 9:
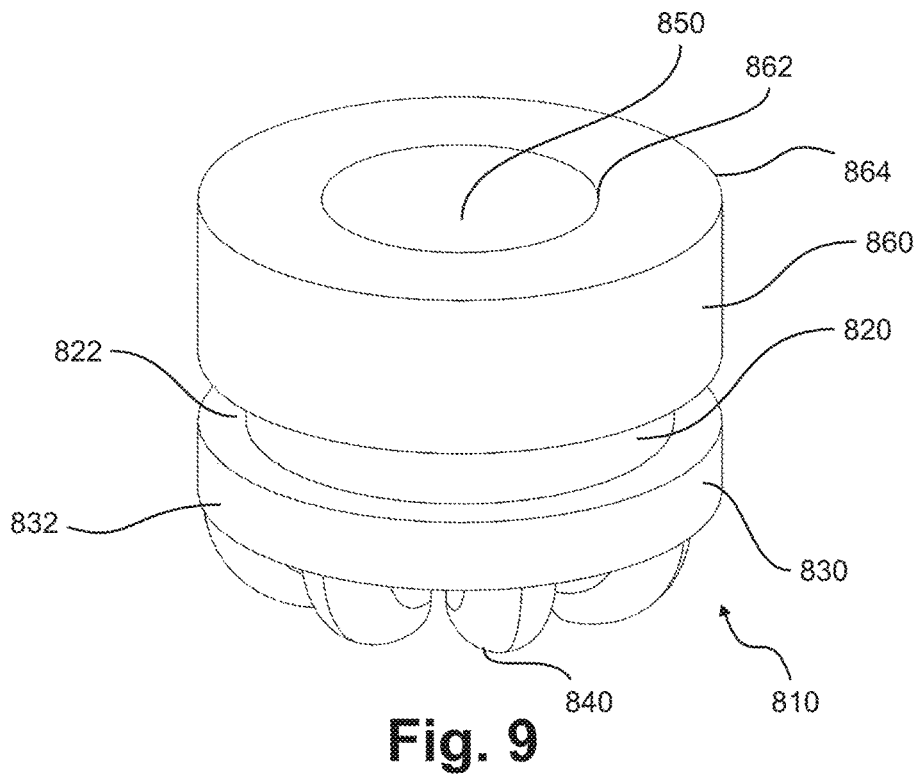
FIG. 9 is a perspective view of vibration dampening block in accordance with an embodiment of the present invention.
Figure 10:
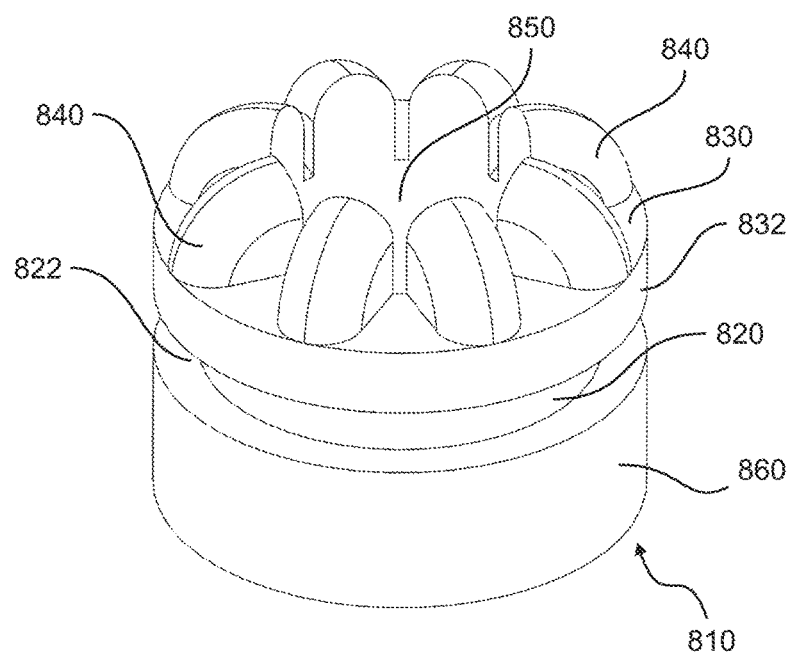
FIG. 10 is an inversed view of the vibration dampening block shown in FIG. 9.

FIGS. 9-12 illustrate different views of an embodiment of a grommet 810. FIG. 9 shows the orientation of the grommet 810 when it is placed near the ceiling 280 inside motor base 102. FIG. 10 shows the inversed orientation of the grommet 810. The grommet 810 is a generally cylindrical and is comprised of three primary regions. It has a bore 850 at its center to provide a channel for a bolt to go through so that a bolted joint 820 shown in FIG. 8 is surrounded by the grommet 810. While several portions of the grommet 810 are described in a further detail immediately below, the grommet 810 is best made by a single mold so that it is in fact made from a single-piece of rubber or any elastomer having resilient properties. Those skilled in the art would appreciate that the exact shape and dimensional of each portion of the grommet 810 may vary, depending on the design of the blender 100 and the vibration of the motor 210.

Figure 11:
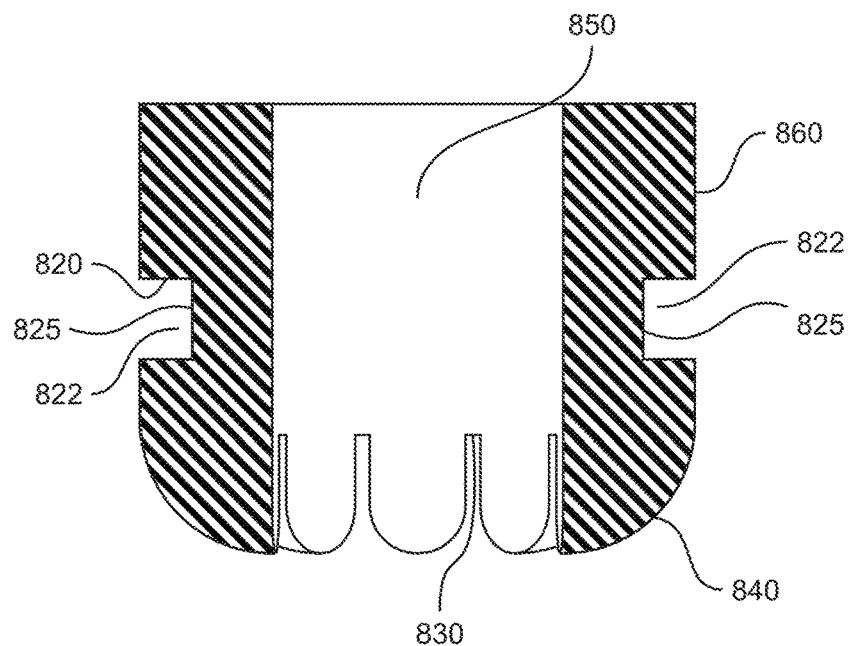
FIG. 11 is a vertical cross-sectional view of the vibration dampening block shown in FIG. 9.

The three primary regions of the grommet 810 are generally defined as an upper portion 860, a middle portion 820, and a lower portion 830. The upper portion 860 is a ring shaped cylinder that functions similar to a rubber bushing. Its inner circumference 862 defines the diameter of the bore 850 that runs through the height of the grommet 810. The upper portion 860 also has an outer circumference 864. The middle portion 820 is another ring shaped cylinder. Its inner circumference is of the same size of the inner circumference 862, as best illustrated in FIG. 11, which is a vertical cross-sectional view of the grommet 810. The outer circumference 825 of the middle portion 820 is smaller than that of the upper portion 860 and that of the lower portion 830 so that the smaller middle portion 820 creates a recess 822. The recess 822 provides a space for the motor mount ceiling 280 to be sandwiched between the upper portion 860 and the lower portion 830, which is best illustrated in FIG. 8. While in this particular embodiment the grommet 810 is generally circular, those skilled in the art would understand that each portion of the grommet 810 could be in other shapes, such as square.

The lower portion 830 comprises another ring shaped cylinder 832 and a plurality of petal members 840 located circumferentially and symmetrically on the surface of the ring shaped cylinder 832. While the outer circumference of the lower portion 830 and that of the upper portion 850 look similar in size in the figures, those skilled in the art would understand that these two outer circumferences do not have to be in the same size as long as they are larger than the middle portion 820 so that a recessed channel is provided in the grommet 810. The petal members 840 surround the bore 850 and provide enhanced reduction of vibration in a manner described in further detail below. The plurality of petal members 840 form a petal shaped support that is best shown in FIG. 10. Preferably, the petal members 840 are positioned in a radially symmetrical manner. In other words, each petal member 840 has a counterpart facing each other at the opposite side of the circumference of the ring shaped cylinder 832.

Figure 12:
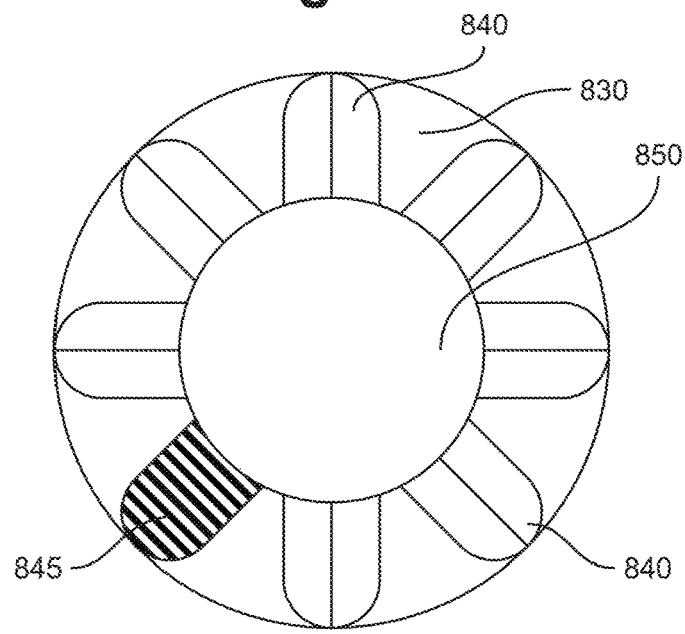
FIG. 12 is a bottom view of the vibration dampening block shown in FIG. 9.
Figure 13:
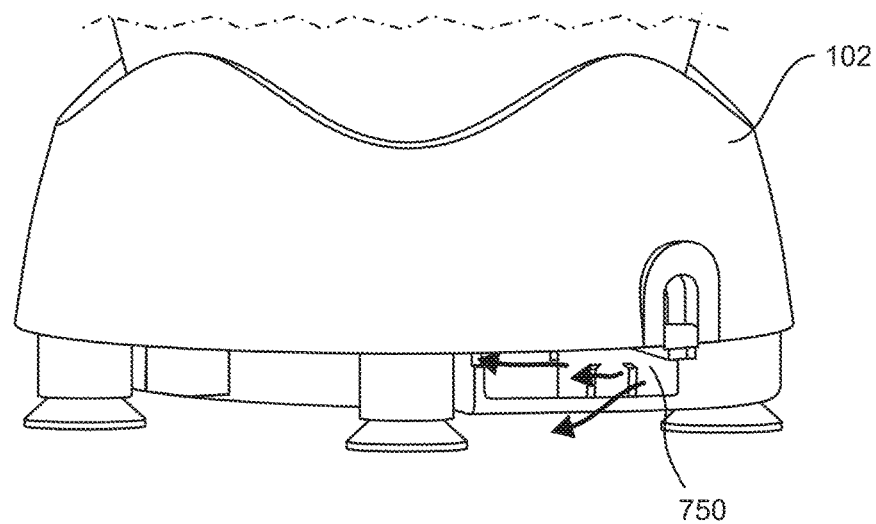
FIG. 13 illustrates an air ventilation system of a food processor in accordance with an embodiment of the present invention.

In a preferred embodiment, the petal members 840 are roughly in a shape of a quarter torus. Their shape is best shown in FIGS. 10 and 11. The quarter torus can generally be defined by a substantially flat vertical surface, a substantially flat horizontal surface, and a curved quarter surface of the torus. The substantially flat horizontal surface is positioned on the surface of the ring shaped cylinder 832. The substantially flat vertical surface surrounds the bore 850 so that the petal members 840 extend the height of the bore 850. The curved outer surface of the quarter torus is oriented to face outward and downward such that the lower part of the grommet 810 resembles a dome shape, as best shown in FIG. 10. While the shape and orientation of members 840 are described in detail for this particular preferred embodiment, those skilled in the art would understand that the petal members 840 could be of other shapes, such as half sphere, triangular and rectangular. In a preferred embodiment, the horizontal cross-sectional area of the petal members is increasing upward (i.e. towards the ring shaped cylinder 832). For example, for the quarter torus petal members 840 shown in the figures, its horizontal cross-sectional area increases from a minimal size at the tip of the petal members 840 to a full horizontal area 845 as shown in FIG. 12. This change in horizontal cross-sectional area enhances vibration reduction in a manner that is discussed in further detail below.

The grommet 810 provides significant vibration reduction in vertical, radial and circumferential directions. Since the motor mount ceiling 280 is inserted at the circumferential recess 822 and is sandwiched between the ring shaped cylinders 832 and 860 at all bolted joints 820, the grommets 810 significantly dampens the vertical vibration of the motor 210 that is suspended under the ceiling 280. Both the ring shaped cylinders 832 and 860 have uniform horizontal cross-sectional area so they provide linear spring rates against deflection. Hence, the motor mount ceiling 280 receives a uniform and steady dampening in both horizontal and vertical directions.

For the motor 210 used in a blender 100 according to some embodiments, the blender 100 is equipped with features including varying speed cycles. Hence, the operation of the high power motor 210 will comprise sudden ramp up, ramp down, and steady speeds. The acceleration and deceleration will create different downward impulses and upward impulses. Usually the upward impulses are particularly strong because the download impulses are balanced by the reactive force of the weight of the blender 100, but there is not sufficient support at the top to counterbalance the upward impulses.

The special shape of petal members 840 of the grommets 810 is specially designed to further reduce the upward impulses. In a preferred embodiment shown in FIGS. 9-12, the petal members 840 are in quarter torus shape and have an increasing horizontal cross-sectional area. Since the petal members 840 are in quarter torus shape, the tip of them are relatively flat and smooth as compared to a petal member that has a triangular shape. The relatively smooth tip provides a flat enough surface for a bolt to contact the grommet 810 and apply force to the grommet 810 more uniformly. Each petal member 840 has an increasing horizontal cross-sectional area toward the ring shaped cylinder 832. Hence, the spring rate of the lower part of the grommet 810 is not uniform. The grommet 810 becomes increasingly stiffer upward. For any upward impulse, the stiffness of the grommet 810 is more resilient at the beginning of the upward motion. Then, when a vibration continues to move upward, the horizontal cross-sectional area of the petal members 840 increases and the grommet 810 becomes more inelastic. The grommet 810 becomes even harder to be compressed when the upward force reaches the ring shaped cylinder 832 because the cross-sectional area becomes greater. Hence, the lower portion 830 of the grommet 810 has a non-uniform spring rate that increases vertically upward. The change in stiffness from resilient to inelastic of the grommet 810 is an effective way to reduce the upward shock forces.

The special shape of the grommet 810 also reduces vibrations in the horizontal direction. Since the bolt that secures the ceiling 280 to the motor base 102 is surrounded by the cylindrical grommet 810 through the bore 850, the wrapping of the bolt reduces the vibration in both radial and circumferential directions. Such vibration reduction is further enhanced by the presence of the petal members 840. For example, for the particular type of petal members 840 shown in the figures, each petal member 840 provides anti-vibration in a radial direction regardless of the direction of vibration due to the symmetrical arrangement of the petal members 840. The quarter torus with the curved surface facing outward provides a geometry that further reduces the vibration from the bolt.

Blender 100 equipped with grommet 810 demonstrates a significant reduction in vibration even if at high speed and when changing speeds at high power. Those skilled in the art would understand that by selecting an appropriate durometer of the elastomer to meet the spring rate requirement of the grommets, one can effectively control the vibration of the motor 210 depending on the power, the speed and the operating cycles of the motor.

Now referring FIGS. 13-16, the blender 100 according to an embodiment of the present invention comprises a novel air ventilation and noise reduction system. The air ventilation system comprises a plurality of air inlets 740 located on the bottom of the motor base 102, a plurality of air outlets 750 located at the side of the motor base 102, and a centrifugal fan 700 that is driven by the motor 210. The arrows in FIGS. 13-16 illustrate the flow direction of the air going in and out of the housing of the motor base 102. The flow of air provides heat reduction and ventilation to the motor 210.

Figure 14:
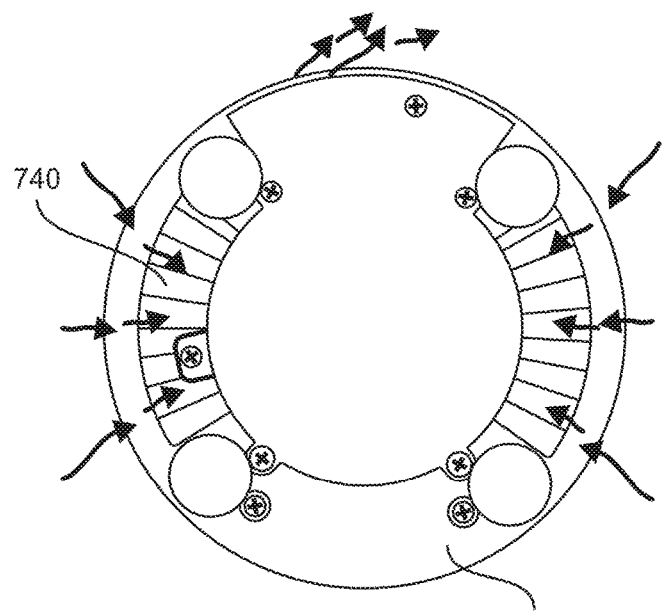
FIG. 14 is a bottom view of a food processor illustrating the air flow of the ventilation system shown in FIG. 13.
Figure 15:
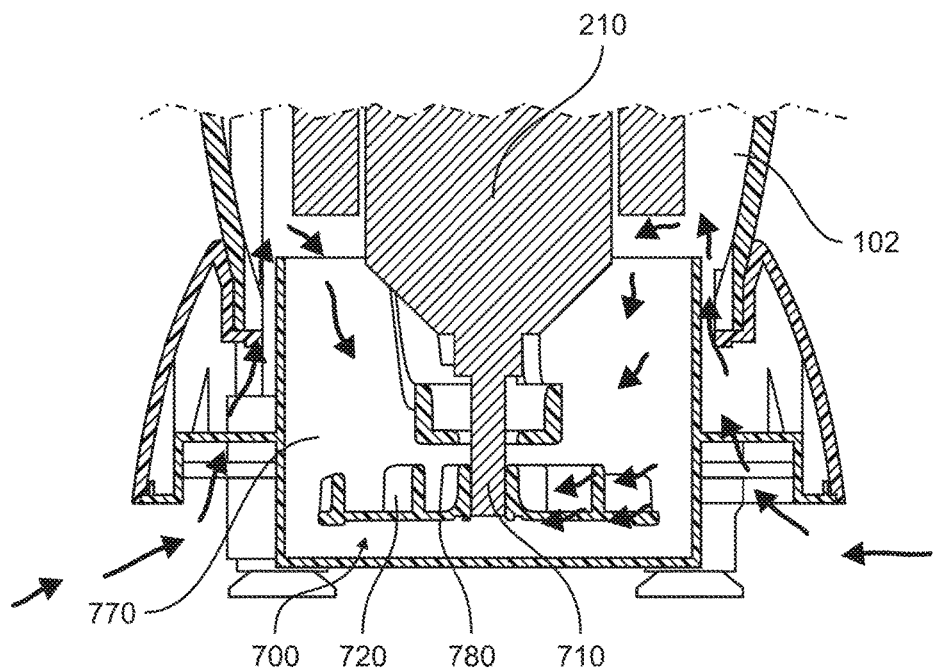
FIG. 15 is an internal schematic view of a food processor illustrating the ventilation system shown in FIG. 13.
Figure 16:
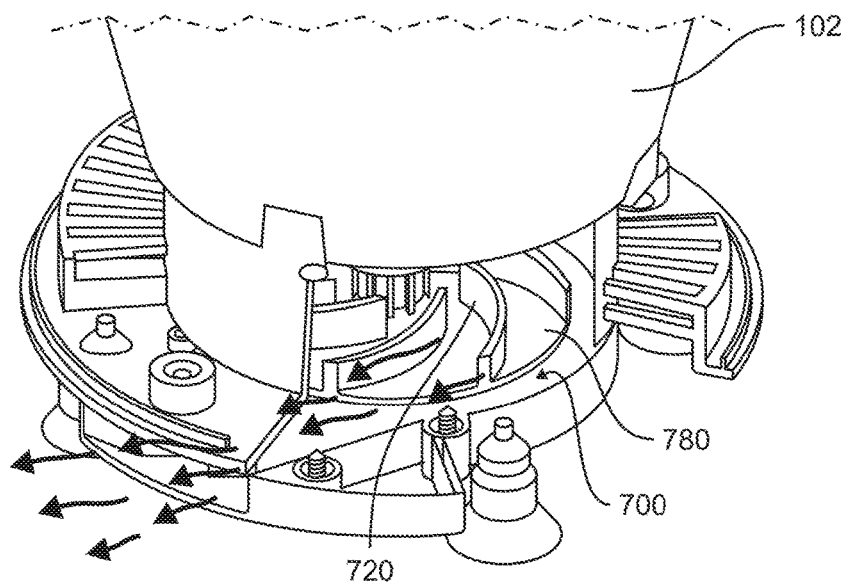
FIG. 16 is an internal perspective view of a food processor illustrating the ventilation system shown in FIG. 13.

In accordance with a preferred embodiment, the centrifugal fan 700 comprises a shaft 710 that is connected to the motor 210 to drive the fan, a hub 780 which is the circular plate of the fan 700 and a series of forward curved blades 720 mounted on the hub 780. The motor base 102 provides passages to direct air from inlets 740 to enter the fan chamber 770 so that the centrifugal fan 700 draws air from the inlets 740. The air passes down vertically to the blades 720 of the centrifugal fan 700, makes a turn, and exits horizontally through the outlets 750. As illustrated in the orientation of FIG. 14, the inlets of 740 are located at left and right sides of the bottom of the motor base 102 while the outputs 750 are located at the back side of the motor base 102. The separation of inlets 740 and the outlets 750 allow the air to flow in a single direction, prevents airflow conflict and obstruction, and improves ventilation of the system. The use of such a centrifugal fan system also provides reduced noise level characteristics while improving the heat dissipation of the motor. This fan system and airflow design is also sensitive to particulates so that the system prevents the accumulation of dust inside the fan chamber 770 and on the blades 720 and the hub 780.

The foregoing description of the embodiments of the present invention has been presented for the purpose of illustration and description. It is not intended to be exhaustive or to limit the invention to the precise form disclosed. Many modifications and variations are possible in light of the above teachings. The numerical values described in the description are only for illustration purpose and should not be understood as limiting the invention to the precise numbers. It is intended that the scope of the present invention not be limited by this detailed description, but by the claims and the equivalents to the claims appended hereto.

I claim:

1. A vibration damper system in a food processor to reduce vibration, comprising:
   a motor suspended from a motor mounting ceiling that is mounted on a housing of a motor base through a plurality of bolted joints;
   each bolted joint is surround by a vibration dampening block;
   the vibration dampening block is defined by an upper portion, a middle portion, a lower portion, and a vertical bore through the center of the vibration dampening block; wherein the middle portion is smaller than the upper portion and the lower portion; wherein a recess is defined in which the motor mounting ceiling is received such that said ceiling is positioned between the upper portion and the lower portion; and the lower portion further comprises a plurality of petal members surrounding the bore; and, a safety switch residing between a higher position and a lower position, wherein said safety switch, when pressed to said lower position, allows the motor to operate.

2. The vibration damper system of claim 1, wherein the safety switch has an upper part on which a rubber cushion is mounted.

3. The vibration dampening block of claim 1, wherein the petal members are positioned in a radially symmetrical manner.

4. The vibration dampening block of claim 1, wherein the petal members are in a shape of a half sphere.

5. The vibration dampening block of claim 1, wherein the petal members are in a shape of a quarter torus.

6. The vibration dampening block of claim 5, wherein the quarter torus shape of the petal members is defined by a substantially flat vertical surface, a substantially flat horizontal surface, and a curved quarter surface of the torus; wherein the quarter circumference of each petal member is oriented to face outward.

7. The vibration dampening block of claim 1, wherein the petal members have horizontal cross-sectional areas that are increasing toward the third ring shaped cylinder.

8. The vibration dampening block of claim 1, wherein the upper portion has a linear spring rate and the lower portion has a non-uniform spring rate that increases vertically upward.

* * * * *